United States Patent [19]

Hamano

[11] Patent Number: 4,554,844

[45] Date of Patent: Nov. 26, 1985

[54] AIR BREATHER FOR POWER TRANSMISSION UNIT

[75] Inventor: Hideo Hamano, Toyota, Japan

[73] Assignee: Toyota Jidosha Kabushiki Kaisha, Aichi, Japan

[21] Appl. No.: 477,399

[22] Filed: Mar. 21, 1983

[30] Foreign Application Priority Data

Mar. 31, 1982 [JP] Japan .................................. 57-53434

[51] Int. Cl.$^4$ ............................................. F16H 57/04
[52] U.S. Cl. .................................. 74/606 R; 74/606 A
[58] Field of Search ......................... 74/606 R, 606 A; 55/319, 385 R

[56] References Cited

U.S. PATENT DOCUMENTS

| | | | |
|---|---|---|---|
| 1,365,836 | 1/1921 | Leverett | 74/606 R |
| 1,529,936 | 3/1925 | Tinniswood | 74/606 R |
| 2,305,012 | 12/1942 | Kinnucan | 74/606 X |
| 3,348,430 | 10/1967 | Polzin | 74/606 R |
| 3,350,958 | 11/1967 | Casale | 74/606 X |
| 3,686,973 | 8/1972 | Davidson et al. | 74/606 R |
| 4,126,201 | 11/1978 | Stevens | 74/606 R |
| 4,151,761 | 5/1979 | Nishikawa et al. | 74/606 A |
| 4,203,331 | 5/1980 | Shindo et al. | 74/606 R |
| 4,351,203 | 9/1982 | Fukunaga | 74/606 R |
| 4,382,497 | 5/1983 | Sakai et al. | 192/113 A |
| 4,446,755 | 5/1984 | Takahashi | 74/606 R |

FOREIGN PATENT DOCUMENTS 2026630  2/1980  United Kingdom ............ 74/606 A

*Primary Examiner*—Gary L. Smith
*Assistant Examiner*—Rodney M. Lindsey
*Attorney, Agent, or Firm*—Parkhurst & Oliff

[57] ABSTRACT

A housing assembly for a power transmission unit comprises a casing provided at the open end thereof with an upright peripheral seating face and a cover member fitted at its upright peripheral seating face to the upright peripheral seating face of the casing in a fluid-tight manner. The cover member is provided at the head portion thereof with a vertical vent hole and is integrally formed at the inner wall thereof with a laterally slanted protrusion fitted to the upper corner of the casing seating face in a fluid-tight manner to form an air passage communicating the vent hole into the casing, and an air breather plug assembly is coupled over the vent hole. The air passage is designed to be wider at its lower portion and to be narrower towards its upper portion. An air chamber is provided between the upper end of the air passage and the vent hole.

6 Claims, 13 Drawing Figures

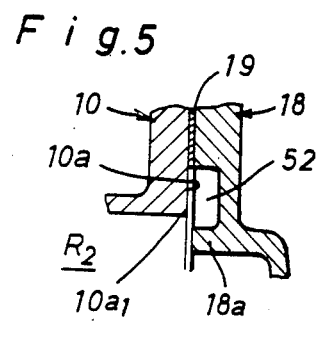 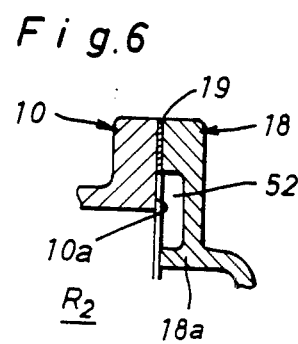

4,554,844

AIR BREATHER FOR POWER TRANSMISSION UNIT

BACKGROUND OF THE INVENTION

The present invention relates to a power transmission unit for automotive vehicles, and more particularly to an air breather adapted to a casing assembly for the power transmission unit.

In such a casing assembly for the power transmission unit, a rotary shaft extends outwardly from the casing unit through oil seal members, and an air breather is provided to allow the flow of air out from the interior of the casing assembly to the exterior so as to prevent an increase of the pressure in the casing assembly upon operation of the unit and to eliminate leakage of the lubricating oil out from the casing assembly across the oil seal members. In a conventional transmission unit, an air passage is formed in a fitted portion of the casing assembly to a cover member fixed thereto in a fluid-tight manner to provide an air breather at a low cost. It has, however, been observed that if the air passage is inappropriate in its position and configuration, there will occur leakage of the lubricating oil across the air passage, causing unexpected difficulty in actual practice. Such leakage of the lubricating oil is caused by formation of an oil film across the air passage, which permits the flow of oil out from the casing assembly under the increased pressure therein.

SUMMARY OF THE INVENTION

It is, therefore, a primary object of the present invention to provide an improved air breather for a power transmission unit which includes an air passage capable of eliminating formation and growth of the oil film thereacross and preventing leakage of the lubricating oil out from the transmission unit.

According to the present invention there is provided a power transmission unit for an automotive vehicle which comprises a casing in the form of a trans-axle casing provided at the open end thereof with an upright peripheral seating face, and a cover member having an upright peripheral seating face fitted in a fluid-tight manner to the upright peripheral seating face of the casing. The upright peripheral seating face of the casing is formed at the upper corner thereof with an upright end wall portion the lower end rim of which extends downwardly from the upper portion of the peripheral seating face of the casing towards a lower side portion. The cover member is provided at the head portion thereof with a vertical vent hole and is integrally formed at the inner wall thereof with a lateral protrusion in the form of a rib fitted to the upright end wall portion of the casing through a seal member to form an air passage communicating the vent hole into the interior of the casing. The lateral protrusion extends downwardly between the upper and side portions of the cover member and is exposed at its lower end to the interior of the casing. An air breather plug assembly is coupled over the vent hole to allow the flow of air out from the interior of the casing to the exterior through the air passage.

It is preferable that the cover member is provided at the head portion thereof with an upright protrusion which is formed therein with an air chamber at its upper portion in open communication with the vent hole and at its lower portion in open communication with the upper end of the air passage.

BRIEF DESCRIPTION OF THE DRAWINGS

The above-mentioned and further objects and features of the present invention will become clear from the following detailed description with reference to the accompanying drawings, in which:

FIGS. 4a and 4b are cross-sectional view taken along line IVA—IVA and IVB—IVB, respectively, in FIG. 3a;

FIG. 5 is a cross-sectional view taken along line V—V in FIG. 3a;

FIG. 6 is a cross-sectional view taken along line VI—VI in FIG. 3a; and

FIG. 7 is a cross-sectional view taken along line VII—VII in FIG. 3a;

FIG. 9 is a cross-sectional view taken along line IX—IX in FIG. 8a.

DETAILED DESCRIPTION OF THE PREFERRED EMBODIMENT

Figure 1:
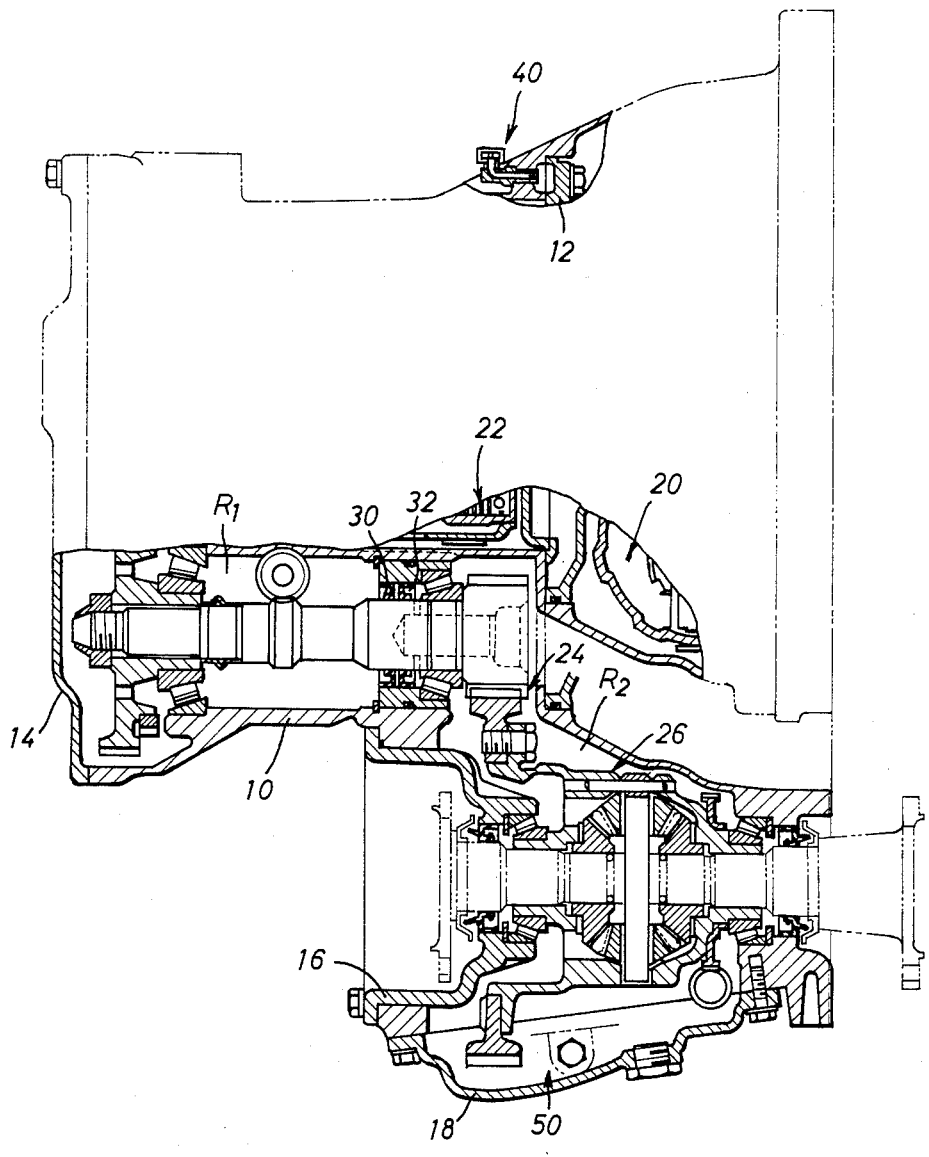
FIG. 1 is a partly sectional view of a power transmission unit provided with an air breather assembly in accordance with the present invention.
Figure 2:
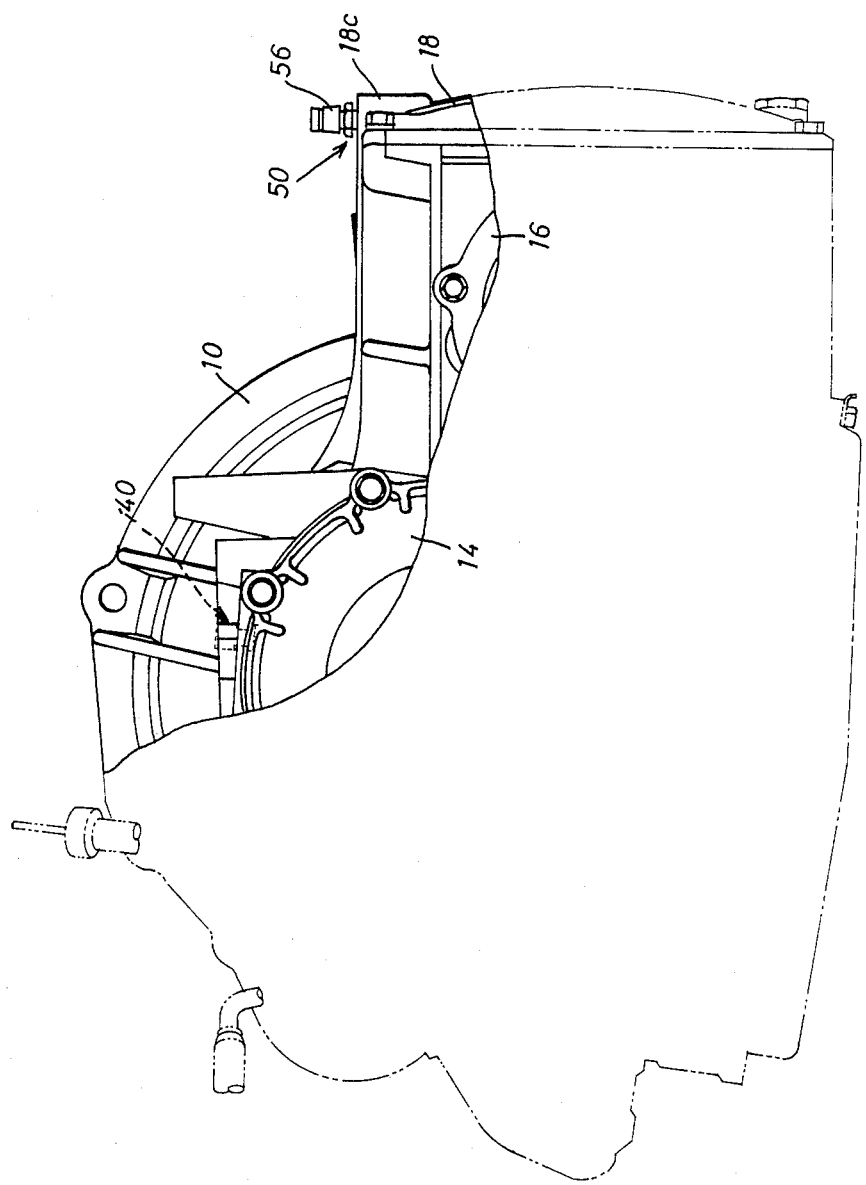
FIG. 2 is a front view of the power transmission unit of FIG. 1.
Figure 3A:
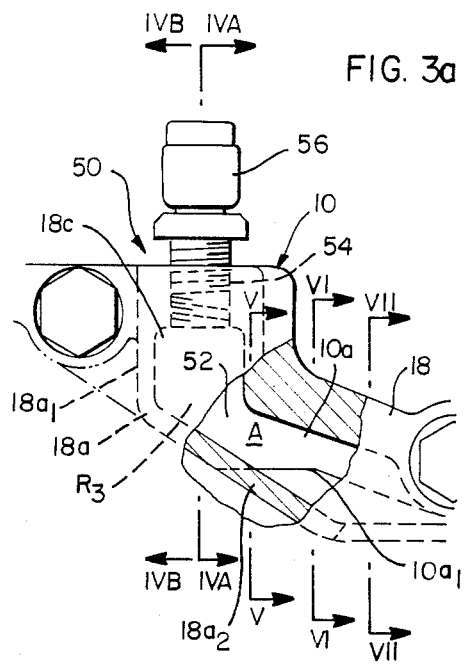
FIG. 3a is a partly broken side view of an air breather assembly in an enlarged scale.
Figure 3B:
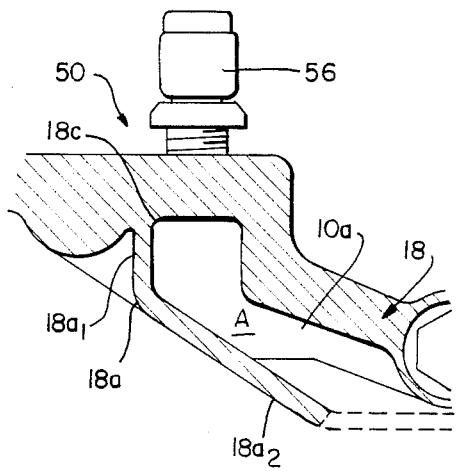
FIGS. 3b and 3c are views of FIG. 3a with increasing portions thereof totally cutaway.
Figure 3C:
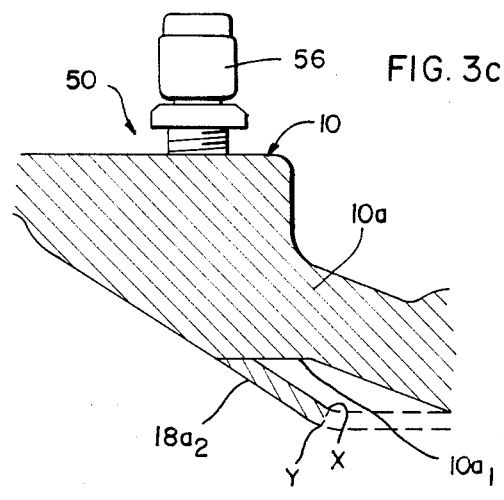
Figure 4A:
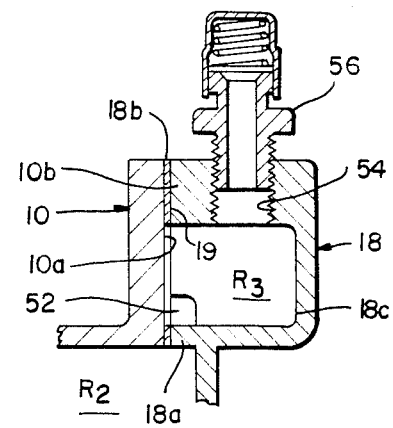
Figure 4B:
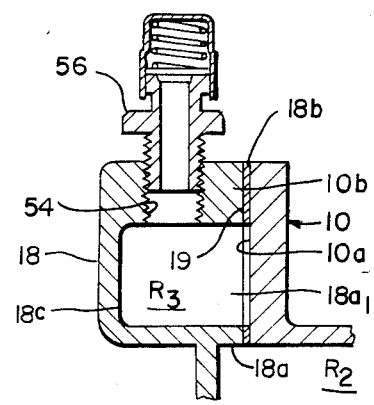

Referring now to the drawings, in particular to FIGS. 1 and 2, there is illustrated a power transmission unit adapted to an internal combustion engine of the transversely mounting type for an automotive vehicle. A housing assembly for the power transmission unit comprises a trans-axle casing 10 which is closed at its side portions by means of a side cover member 14 and a retainer case 16 fixed thereto in a fluid-tight manner and is closed at its rear portion by means of a rear cover member 18 fixed thereto in a fluid-tight manner. Assembled within the trans-axle casing 10 are an oil pump body 12, a torque converter assembly 20, a planetary gearing assembly 22, a final speed-reduction gearing 24 and a differential gear unit 26. The interior of trans-axle casing 10 is subdivided by a pair of oil seal members 30, 32 into first and second chambers $R_1$ and $R_2$. The first chamber $R_1$ stores therein an amount of lubricating oil for planetary gearing assembly 22, while the second chamber $R_2$ stores therein an amount of lubricating oil for final speed reduction gearing 24 and differential gear unit 26. In such an arrangement, the first chamber $R_1$ is provided at the upper portion thereof with a conventional air breather assembly 40, while the second chamber $R_2$ is provided at the upper portion thereof with an air breather assembly 50 in accordance with the present invention.

As can be well seen in FIGS. 3–7, an air passage 52 is formed in a fitted portion of upright peripheral seating faces 10b and 18b of trans-axle casing 10 and rear cover member 18, and a vertical vent hole 54 is provided in the head portion of rear cover member 18. The air breather assembly 50 includes an air breather plug 56 which is threaded into vent hole 54 of cover member 18 to allow the flow of air out from the interior of second chamber $R_2$ to the exterior through air passage 52 and vent hole 54. The air passage 52 is formed by a lateral protrusion in the form of a rib 18a integral with the inner wall of cover member 18 which is fitted to an upright end wall portion 10a integral with the upright peripheral seating face 10b of trans-axle casing 10. The upright end wall portion 10a is located at the upper corner of peripheral seating face 10b of casing 10 fitted to the peripheral seating face 18b of cover member 18 through a seal member 19. As best seen in FIG. 3c, the lower end rim of upright end wall portion 10a extends downwardly from the upper portion of peripheral seating face 10b of casing 10 toward a lower side portion and is substantially horizontal at its intermediate portion $10a_1$. As best seen in FIG. 3b, the lateral protrusion 18a includes a vertical rib portion $18a_1$ extending downwardly from the upper portion of peripheral seating face 18b of cover member 18 and a slant rib portion $18a_2$ extending downwardly from portion $18a_1$ toward the side portion of peripheral seating face 18b of cover member 18. Referring again to FIG. 3c, it will be seen that the slant rib portion $18a_2$ of lateral protrusion 18a is exposed at its lower end to the interior of second chamber $R_2$. The slant rib portion $18a_2$ eventually recedes into the body of the cover 18 at the points designated X and Y in FIGS. 3c and 7. In such an arrangement, the air passage 52 is designed to be wider at its lower portion and to be narrower toward its upper portion. This serves to eliminate formation and growth of an oil film at the lower portion of air passage 52 and to prevent leakage of the lubricating oil across the fitted portion of casing 10 and cover member 18. In observation of the interior of air passage 52 with the breather plug 56 removed, it has been confirmed that an oil film breaks at the narrow portion A of air passage 52.

Figure 8A:
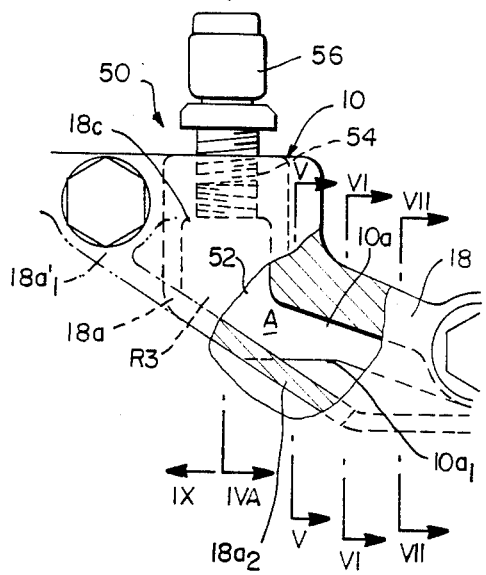
FIG. 8a is a view analogous to FIG. 3a of an alternative embodiment of an air breathing apparatus.
Figure 8B:
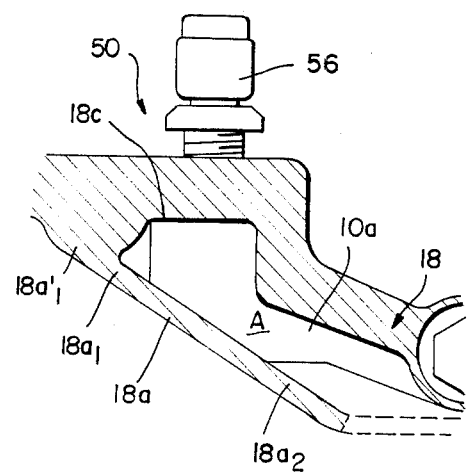
FIG. 8b is a view of the embodiment of FIG. 8a analogous to FIG. 8b.
Figure 7:
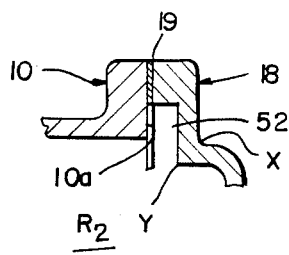
Figure 9:
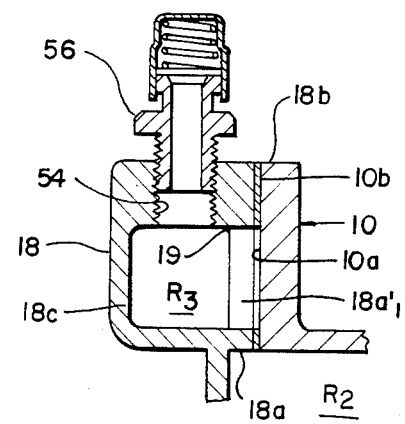

In this embodiment, it is further noted that the rear cover member 18 is formed at the head portion thereof with an upright protrusion 18c which is formed therein with an air chamber $R_3$ at its upper portion in open communication with vent hole 54 and at its lower portion in open communication with air passage 52. In such arrangement, even if an oil film does not break at the narrow portion A of air passage 52, it will expand and break in the air chamber $R_3$ and drop into the interior of second chamber $R_2$. In the actual practice of the present invention, the air chamber $R_3$ in upright protrusion 18c may be eliminated, and the vertical rib portion $18a_1$ of lateral protrusion 18a may be replaced with a slant rib portion $18a_1'$ as shown in FIGS. 8a, 8b and 9.

While a particular embodiment of the present invention has been shown and described above, it will be obvious that various modifications can be made without departing from the spirit of the invention and the scope of the appended claims.

What is claimed is:

1. An air breather apparatus for a transmission, comprising:
    a transmission casing for containing a transmission, the casing having formed on an open end thereof an upright peripheral seating face and an upright wall portion;
    a cover for sealably closing said open end, the cover having;
        an upright peripheral seating face sealably engaging said casing seating face to seal the periphery of said transmission casing;
        a rib laterally protruding from an inner face of the cover and sealably engaging said casing wall portion along an upper portion of the length of said rib, at least a portion of said rib extending substantially diagonally downwards from an upper portion of said cover towards a lower side portion of said cover, and a lower portion of said rib being exposed to an interior of said casing;
        an air chamber in an upper portion of said cover, one wall of said air chamber being formed by said casing wall portion and at least one additional wall being formed at least partially by said rib; and
        a vent communicating between an upper end of said air chamber and an exterior of said cover, said vent having an air breather plug assembly inserted therein;
    wherein said rib, said cover innerface, said cover seating face and said casing seating face define therebetween an air passage communicating between said casing interior and a lower portion of said air chamber, an upper portion of said passage being substantially narrower than a lower portion of said passage, and said air chamber having a substantially greater cross-sectional area than said air passage.

2. The air breather apparatus of claim 1, wherein said rib comprises a substantially vertical portion of an upper end thereof, said slanting portion extending from a lower end of said vertical portion, and said vertical portion forming at least a portion of a wall of said air chamber.

3. The air breather apparatus of claim 1, wherein said slanting portion of said rib extends from said cover seating face, an upper portion of said rib forming at least a portion of a wall of said air chamber.

4. A power transmission unit for an automotive vehicle comprising a casing formed at an open end thereof with an upright peripheral seating face and arranged to contain said transmission unit therein, and a cover member having an upright peripheral seating face fitted to the casing seating face in a fluid-tight manner, wherein the casing seating face is formed at an upper corner thereof with an upright end wall portion having a lower end rim extending substantially diagonally downwardly from an upper portion of the casing seating face toward a lower side portion of the casing seating face, and said cover member is provided at a head portion thereof with an upright protrusion having a vertical vent hole at a top thereof and having therein an air chamber, said cover member being integrally formed at an inner wall thereof with a lateral protrusion extending downwardly from the upper portion of the cover sealing face toward the interior of said casing, said lateral protrusion being fitted to an upright end wall portion of said casing in a fluid-tight manner and being exposed at its lower end to said casing interior to form an air passage in open communication at its upper portion with said vent hole through said air chamber and at its lower portion with said casing interior, and wherein an air breather plug assembly is coupled over said vent hole to allow the flow of air out from the interior of said casing to the exterior through said air passage and said air chamber.

5. A power transmission unit as claimed in claim 4, wherein said lateral protrusion of said cover member includes a vertical rib portion extending downwardly from the upper portion of said casing sealing face and a slant rib portion extending substantially diagonally downwardly from the lower end of said vertical rib portion toward the interior of said casing, said vertical rib portion being fitted to the casing end wall portion to form said air chamber, and said slant rib portion being fitted at its upper portion to the casing end all portion and being exposed at its lower end to the interior of said casing to form said air passage, said passage being wider at its lower portion than at its upper portion.

6. A power transmission unit as claimed in claim 4, wherein said lateral protrusion includes a slant rib portion extending substantially diagonally from the upper portion of said cover seating face toward the interior of said casing, said slant rib portion being fitted at its upper portion to the casing end wall portion and being exposed at its lower end to the interior of said casing to form said air chamber and to form said air passage, said passage eing wider at its lower portion and narrower at its upper portion.

* * * * *